United States Patent
Bodenmüller et al.

(10) Patent No.: US 11,053,064 B2
(45) Date of Patent: Jul. 6, 2021

(54) CARTRIDGE, CORE, MOLD AND METHOD OF MANUFACTURING A CARTRIDGE

(71) Applicant: Sulzer Mixpac AG, Haag (CH)

(72) Inventors: Tobias Bodenmüller, Eriskirch (DE); Richard Lavelanet, Balgach (CH); Philipp Seiler, Widnau (CH); Markus Heule, Widnau (CH); Hans Aeberhard, Margrethen (CH)

(73) Assignee: SULZER MIXPAC AG, Haag (CH)

( * ) Notice: Subject to any disclaimer, the term of this patent is extended or adjusted under 35 U.S.C. 154(b) by 269 days.

(21) Appl. No.: 16/314,531

(22) PCT Filed: Jun. 13, 2017

(86) PCT No.: PCT/EP2017/064448
§ 371 (c)(1),
(2) Date: Dec. 31, 2018

(87) PCT Pub. No.: WO2018/001723
PCT Pub. Date: Jan. 4, 2018

(65) Prior Publication Data
US 2019/0241351 A1    Aug. 8, 2019

(30) Foreign Application Priority Data

Jul. 1, 2016    (EP) .................................... 16177607

(51) Int. Cl.
*B65D 83/00*    (2006.01)
*B29C 45/14*    (2006.01)
(Continued)

(52) U.S. Cl.
CPC .......... *B65D 83/0055* (2013.01); *B29C 33/76* (2013.01); *B29C 45/14065* (2013.01);
(Continued)

(58) Field of Classification Search
None
See application file for complete search history.

(56) References Cited

U.S. PATENT DOCUMENTS 3,417,899 A * 12/1968 Brown .............. B29C 45/14598
220/611
3,435,500 A    4/1969 Aser et al.
(Continued)

FOREIGN PATENT DOCUMENTS

CA    2942622 A1    10/2015
CN    203844153 U    9/2014
(Continued)

OTHER PUBLICATIONS

International Search Report dated Aug. 21, 2017 in corresponding International Application No. PCT/EP2017/064448, filed Jun. 13, 2017.
(Continued)

*Primary Examiner* — Edmund H Lee
(74) *Attorney, Agent, or Firm* — Global IP Counselors, LLP

(57) ABSTRACT

A cartridge for a medium to be dispensed includes a head part having a dispensing outlet and a film forming a cartridge wall, with the film bounding a cartridge chamber for the medium to be dispensed, extending at least partially in a longitudinal direction of the cartridge and having a front end that is connected to the head part. The head part has a collar, the collar surrounding the dispensing outlet in a radially outer region of the head part and extending in the longitudinal direction. The front end of the film is sealingly and non-releasably connected to the collar of the head part. The collar of the head part has an inner surface extending in the longitudinal direction and includes at least one projection projecting radially inwardly.

19 Claims, 6 Drawing Sheets

(51) Int. Cl.
　　　*B29C 33/76*　　　(2006.01)
　　　*B29C 45/26*　　　(2006.01)
　　　*B29C 45/36*　　　(2006.01)
　　　*B65D 81/32*　　　(2006.01)
　　　*B29L 31/00*　　　(2006.01)

(52) U.S. Cl.
　　　CPC ...... *B29C 45/14598* (2013.01); *B29C 45/261* (2013.01); *B29C 45/36* (2013.01); *B65D 81/3288* (2013.01); *B29L 2031/712* (2013.01)

(56) References Cited

U.S. PATENT DOCUMENTS

| | | | |
|---|---|---|---|
| 4,238,106 A | 12/1980 | Willingham | |
| 4,338,278 A * | 7/1982 | Schultz | B29C 45/14598 264/261 |
| 4,503,105 A | 5/1985 | Tomioka | |
| 4,687,663 A | 8/1987 | Schaeffer | |
| 4,988,472 A * | 1/1991 | Orimoto | B29C 33/126 264/273 |
| 4,989,802 A | 2/1991 | Akao et al. | |
| 5,002,623 A | 3/1991 | Steer et al. | |
| 5,184,757 A | 2/1993 | Giannuzzi | |
| 5,219,373 A * | 6/1993 | Hatakeyama | B29C 31/002 264/250 |
| 5,360,146 A | 11/1994 | Ikushima | |
| 5,593,066 A | 1/1997 | Konuma et al. | |
| 5,647,510 A | 7/1997 | Keller | |
| 5,873,970 A * | 2/1999 | Konuma | B05C 17/00506 156/197 |
| 5,993,720 A | 11/1999 | Konuma et al. | |
| 6,048,201 A | 4/2000 | Zwingenberger | |
| 6,051,295 A | 4/2000 | Schloss et al. | |
| 6,129,244 A | 10/2000 | Horth | |
| 6,334,548 B1 | 1/2002 | Ichikawa et al. | |
| 6,551,543 B1 * | 4/2003 | Keller | B29D 23/20 264/478 |
| 6,712,232 B2 * | 3/2004 | Tanaka | B29C 45/14598 215/379 |
| 6,971,787 B2 | 12/2005 | Botrie et al. | |
| 7,048,883 B2 * | 5/2006 | Tanaka | B29C 45/14598 264/252 |
| 7,137,531 B2 | 11/2006 | Arghyris et al. | |
| 7,144,170 B2 | 12/2006 | Parks et al. | |
| 7,303,712 B2 | 12/2007 | Kitamura et al. | |
| 7,311,868 B2 * | 12/2007 | Ek | B29C 45/0046 264/268 |
| 7,815,384 B2 | 10/2010 | Parks et al. | |
| 8,028,859 B2 | 10/2011 | Paetow et al. | |
| 8,297,474 B2 | 10/2012 | Schell | |
| 8,690,012 B2 | 4/2014 | Stoeckli et al. | |
| 2005/0109796 A1 | 5/2005 | Bourque et al. | |
| 2005/0138792 A1 | 6/2005 | Black et al. | |
| 2006/0021996 A1 | 2/2006 | Scott et al. | |
| 2006/0188314 A1 | 8/2006 | Hunter et al. | |
| 2009/0084753 A1 * | 4/2009 | Ramos | B29C 45/14344 215/346 |
| 2010/0166923 A1 * | 7/2010 | Martini | B65D 85/72 426/115 |
| 2014/0174037 A1 | 6/2014 | Frey | |
| 2015/0059288 A1 | 3/2015 | Wu | |
| 2016/0029832 A1 | 2/2016 | Iotti | |

FOREIGN PATENT DOCUMENTS

| | | |
|---|---|---|
| EP | 0326355 A2 | 8/1989 |
| EP | 1829796 A1 | 9/2007 |
| EP | 2548709 A1 | 1/2013 |
| EP | 2684829 A1 | 1/2014 |
| FR | 3010069 A1 | 3/2015 |
| JP | 6-53469 A | 2/1994 |
| JP | 6-336254 A | 12/1994 |
| JP | 2001225853 A | 8/2001 |
| JP | 2010208193 A | 9/2010 |
| JP | 2015150846 A | 8/2015 |
| WO | 0027730 A1 | 5/2000 |
| WO | 2009113502 A1 | 9/2009 |
| WO | 2014140097 A1 | 9/2014 |
| WO | 2014186362 A1 | 11/2014 |
| WO | 2014206297 A1 | 12/2014 |
| WO | 2015157006 A1 | 10/2015 |
| WO | 2015160552 A1 | 10/2015 |

OTHER PUBLICATIONS

Extended European Search Report dated Dec. 22, 2016 in corresponding European Patent Application No. 16177607.5, filed Jul. 1, 2016.

* cited by examiner

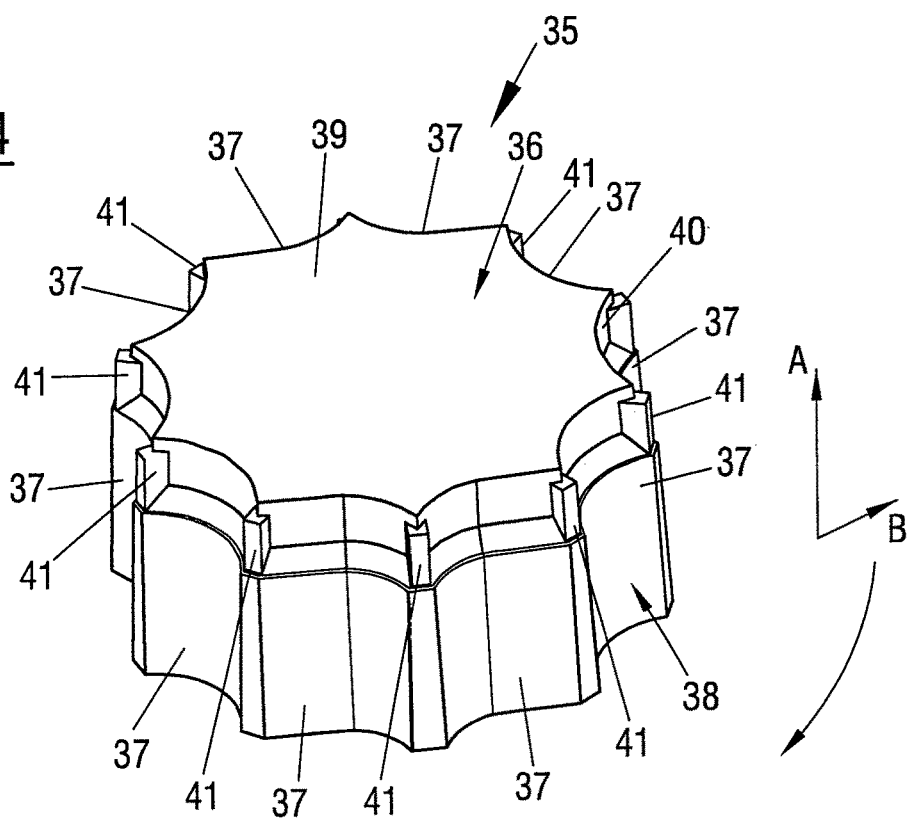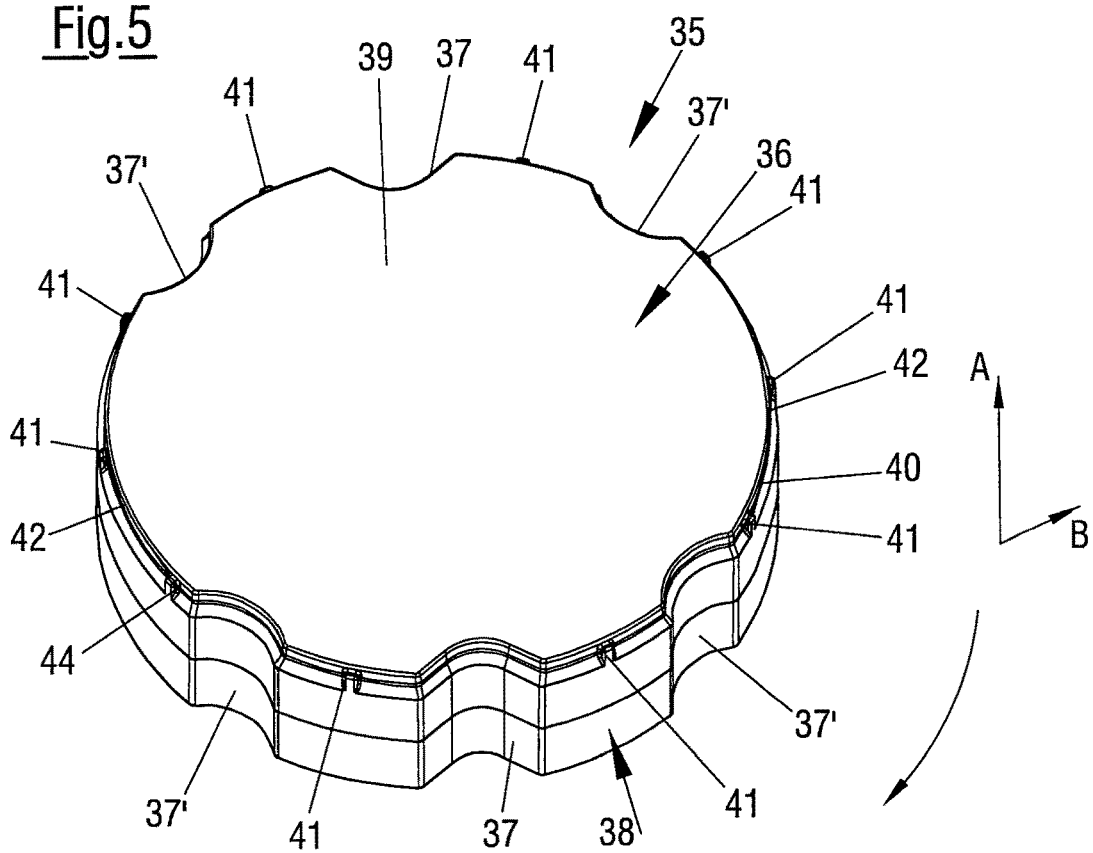

CARTRIDGE, CORE, MOLD AND METHOD OF MANUFACTURING A CARTRIDGE

CROSS-REFERENCE APPLICATION

This application is a U.S. National Stage Application of International Application No. PCT/EP2017/064448, filed Jun. 13, 2017, which claims priority to European Application No. 16177607.5, filed Jul. 1, 2016, the contents of each of which is hereby incorporated herein by reference.

BACKGROUND

Field of Invention

The present invention relates to a cartridge for a medium to be dispensed comprising a head part having a dispensing outlet and a film forming a cartridge wall, with the film bounding a cartridge chamber for the medium to be dispensed, extending at least partially in a longitudinal direction of the cartridge and having a front end that is connected to the head part. The invention further relates to a core for a mold for molding a head part, to a mold for molding a head part and to a method of manufacturing a cartridge.

Background Information

In the industrial sector, in the construction industry, for example of buildings, and also in the dental sector, cartridges are frequently used to store flowable liquids, frequently pasty or viscous to highly viscous substances and to dispense them for the respective application as required. Examples of such substances are joint sealing compounds, compounds for chemical dowels or chemical anchors, adhesives, pastes or impression materials in the dental sector. These cartridges are usually produced from plastic and are manufactured in an injection molding process.

A distinction is made between single-component systems in which the material to be dispensed is only made of one component and two-component or multicomponent systems in which at least two different components are stored in separate chambers of the same cartridge or in separate cartridges, wherein the components are intimately mixed on dispensing by a dynamic or static mixing apparatus. Examples for this are two-component adhesives or chemical dowels which only harden after the mixing of the two components. Two-component systems are in particular also used in the industrial sector for paints which are often used to generate functional protective layers such as for corrosion protection.

SUMMARY

For reasons of environmental protection, film cartridges are increasingly being used. In contrast to regular cartridges which are completely produced from plastic in an injection molding process, at least parts of film cartridges are designed as a film. Usually the cartridge wall(s) bounding the cartridge chamber(s) is/are made of a film which is connected to a head part made of rigid material, e.g. plastic, comprising the dispensing outlet. This has several advantages. On the one hand, the unfilled film cartridges can be stored and transported in a collapsed state from the cartridge manufacturers to the manufacturers of the filling materials (media) who then take care of the filling of the empty cartridges. Only after being filled the film cartridge is in its expanded state which is comparable in size to a regular non-collapsible cartridge. This means that the necessary space for storage and for transportation can be reduced, since the collapsed cartridges have a reduced size in comparison to regular non-collapsible cartridges.

On the other hand, once the cartridges have been used, i.e. reduced to the collapsed state by dispensing the filling material, the cartridges are significantly reduced in size and weight in comparison to regular cartridges so that the cost of disposal is also reduced. In any case the carbon footprint associated with the film cartridges is reduced in comparison to plastic cartridges that are completely formed in an injection molding process.

During the manufacture of a film cartridge with an injection molded head, one has to place a cylindrical film over a core that is part of a mold. In matching the diameters of film and core the following problems occur:

Firstly, if the core diameter is too large (but still smaller than the film diameter), it is cumbersome to place the film over the core.

Secondly, if the core diameter is too small, the film sits rather loose on the core and may move during injection molding, i.e. become detached from the injection molded head.

Thirdly, the diameter of the film has some variance due to manufacturing tolerances.

For this reason it is an object of the invention to make the placement of the film over the core easier and more reliable for a great variety of film diameters that can be used with one and the same core in the same mold of an injection molding tool. It is a further object of the invention to reduce the number of rejected cartridges due to detached injection molded heads. It is yet a further object of the present invention to propose a cartridge of the initially named kind and a method of manufacturing such a cartridge by which the total manufacturing costs can be reduced.

These objects are satisfied by a core for a mold for molding and thereby attaching a head part of a cartridge to a film forming a cartridge wall, with the film having a front end, wherein the front end of the film is to be sealingly and non-releasably connected to the head part, the core comprising a cartridge head forming end, with the core having at least one recess formed in the cartridge head forming end at an outer circumferential surface of the core, with the at least one recess in particular extending in a longitudinal direction of the core, and most preferably extending in a uniform manner at least over an extent of the cartridge head forming end in the longitudinal direction of the core.

The provision of the at least one recess in the cartridge head forming end enables a reduction in the circumference of the core, such that a film used for forming the cartridge wall (with all its variances in diameter) may always be easily mounted on the core, during manufacture of the cartridge head part. This is because the film can be actively pushed into the at least one recess present at the core to collect any slack present in the film through the use of sliders that are present in the mold and that have at least one projection corresponding to the at least one recess. This at least one projection of the sliders can then engage the at least one recess and exert a strain on the film and thus ensure a tight fit of the film to the core even with a reduction in the core diameter. The variances of the film diameters are compensated by the film's property to elongate to a certain degree under strain.

The dimensions of the at least one recess must be chosen such that all the slack can be collected even at the largest possible film diameter and such that the strain on films having the smallest possible diameter does not lead to a damage of the film.

In this connection it should be noted that the feature according to which the at least one recess preferably extends in a uniform manner at least over the extent of the cartridge head forming end, means that the at least one recess has an at least essentially constant width and depth over a length of the at least one recess with respect to the outer circumferential surface of the core, at least in the region of the cartridge head forming end. It should also be noted that the length of the at least one recess is at least as long as a length of the cartridge head forming end in the longitudinal direction of the core.

It should further be noted that the head part of the cartridge is a stable shaped part, e.g. of injection molded plastic, that forms the front plate of the cartridge. The head part respectively the front plate comprises a dispensing outlet via which a component stored in the cartridge can be dispensed.

Preferably a shape of a cross-section of the at least one recess is one of part cylindrical, part triangular with rounded edges and part polygonal with rounded edges. The provision of one or more recesses that have rounded edges or are part cylindrical ensures that no sharp points of contact are present between the core and the film forming the cartridge wall to prevent the film from being damaged.

Preferably the at least one recess has an elongate shape having a length selected in the range of 7 mm to 30 mm, preferably 9 mm to 17 mm. Selecting a recess in this size range facilitates the attachment of the film to the head part on forming the head part at the core.

It is preferred if the at least one recess extends from an end face of the cartridge head forming end. In this way the at least one recess is present at the very end of the cartridge head forming end. Due to the provision of the at least one recess, the core diameter can be reduced in comparison to prior art cores which facilitates placement of the film over the core. The overall reduction in core diameter is made possible, as the at least one recess enables the film forming the cartridge wall to be tightly pulled and/or stretched around the core circumference by pushing excess material of the film into the at least one recess during a manufacture of the cartridge head. In this way a tight fit of the film on the core is achieved during the injection molding process although the core diameter is reduced in comparison to the prior art cores.

It should be noted in this connection that the at least one recess can extend over a complete axial length of the core.

It should further be noted that the part of the core that does not form part of the cartridge head forming end and/or regions required at the core to form the head part of the cartridge at the cartridge head forming end, can have a reduced outer diameter in comparison to the cartridge head forming end, with the regions required at the core to form the head part including spaces into which components of a mold used to form the cartridge head at the cartridge head forming end can engage.

Advantageously the at least one recess has a depth from the outer surface of the core selected in the range of 0.4 mm to 2.5 mm, preferably 0.5 mm to 0.7 mm. Such depths, on the one hand, allow a reduced diameter of the core which enables the film forming the cartridge wall to be more easily placed over the core. On the other hand, any projections that result in an inner surface of a correspondingly formed head part do not dramatically interfere with a piston that is used to dispense a medium from a cartridge. The width of the at least one recess in the circumferential direction may be selected in the range of 2 mm to 15 mm, preferably 4 mm to 9 mm.

Preferably the cartridge head forming end comprises a plurality of recesses formed in the outer circumferential surface of the core, with the plurality of recesses comprising first recesses and second recesses with the first and second recesses having different shapes, diameters, widths and/or dimensions.

Providing different types of recesses in the core means that different recesses can be provided for different specific uses on molding a head part. For example, recesses can be provided that can be used to introduce a strain into the film forming the cartridge wall before a mold for forming the cartridge head is closed around the core, so that no film material is accidentally clamped between parts of the mold. Other recesses can be provided to ensure that the cartridge head forming end has a sufficiently uniformly reduced circumference, for example.

Advantageously the cartridge head forming end further comprises a cavity extending between the outer circumferential surface of the core and an end face of the core, with the cavity circumferentially extending around the core and throughout the at least one recess. The provision of a circumferentially extending cavity, i.e. a cavity extending on an outer surface in a radial manner, ensures that the circumference of the core is further reduced in the region of the cartridge head forming end to facilitate the placement of the film forming the cartridge wall over the core.

Advantageously a profile of the cross-section of the cartridge head forming end has a generally rounded shape, a corrugated shape, a generally polygonal shape, in particular a rounded or polygonal shape having at least one recess formed therein, with at least part of the at least one recess having different shapes, preferably arched or part circular shapes, different widths and/or different diameters in cross-section. Such shapes can advantageously be used to achieve a reduction in the circumference of the core and to facilitate the placement of the film forming the cartridge wall over the core.

In a further aspect the present invention relates to a mold for molding and thereby attaching a head part of a cartridge to a film forming a cartridge wall, the mold comprising a core in accordance with the teaching presented herein, a region forming a head space in which the head part of the cartridge is formed and within which the film is sealingly and non-releasably connected to the head part and at least two sliders adapted to engage the film surrounding the core and to engage the core via the film adjacent to the cartridge head forming end, with the at least two sliders forming a boundary of the head space.

The advantages associated with the core in accordance with the invention likewise hold true for the mold described herein.

Preferably at least one of the at least two sliders has at least one mold projection corresponding to a shape of the at least one recess of the core. Such a projection can advantageously be used to exert a strain on the film on closing the mold such that film possibly present between contact surfaces of each slider can be removed from the region of the contact surfaces by being moved out of this region and into a recess present at the core due to the at least one projection.

In a further aspect, the present invention relates to a method of manufacturing a cartridge using a mold in accordance with the teaching described herein, the method comprising the steps of:

placing the at least one film on the core;
placing the film and core in the mold;
moving the at least two sliders to clamp the film into position by inserting the at least one mold projection of the sliders into the at least one recess of the core and clamping the film between them; and
injection molding a head part of the cartridge in the head space of the mold to form the head part and to sealingly and non-releasably connect the film to the head part.

The advantages associated with the core likewise hold true for the corresponding features of method of manufacturing the cartridge.

The above objects are further satisfied by a cartridge for a medium to be dispensed, the cartridge comprising a head part having a dispensing outlet and a film forming a cartridge wall, with the film bounding a cartridge chamber for the medium to be dispensed, extending at least partially in a longitudinal direction of the cartridge and having a front end that is connected to the head part, wherein the film is preferably a multilayer film having at least two layers formed from different materials, wherein the head part has a collar, the collar surrounding the dispensing outlet in a radially outer region of the head part and extending in the longitudinal direction, wherein the front end of the film is sealingly and non-releasably connected to the collar of the head part, and wherein the collar of the head part has an inner surface extending in the longitudinal direction and comprising at least one projection projecting radially inwardly.

The advantages associated with the core likewise hold true for the corresponding features of the cartridge.

To the knowledge of the applicant there is no indication present in the prior art that would suggest the provision of at least one projection at the inner surface of the collar of the cartridge head part, this means to provide a collar that deviates from the typically circular (or annular) shape. This is because it was previously believed that deviations from a round collar provide a point of interaction at which the film may be subjected to stresses and tear during the manufacturing, filling, storage and dispensing process.

Preferably the front end of the film has at least one depression, with the at least one depression being aligned with the at least one projection of the inner surface of the collar. In this way the film forming the cartridge wall follows the shape of the collar by having at least one depression in the vicinity of the position of the at least one projection.

Advantageously, the at least one projection extends at least substantially over a length, in particular over the entire length, of the inner surface of the collar in the longitudinal direction. In this way at least one elongate projection is formed at the inner surface of the collar rather than a point like projection that could damage the film forming the cartridge wall.

It is preferred if the length of the collar in the longitudinal direction and/or a length of the at least one projection in the longitudinal direction is selected in the range of 3 mm to 20 mm, preferably 5 mm to 7 mm. In this way a particularly good attachment can be provided between the collar and the film forming the cartridge wall, as a sufficient area is provided for the connection between these two components. Moreover, the collar is provided with sufficient material to ensure that the head part can withstand any pressures that may arise in a dispenser into which the cartridge is inserted in use.

Advantageously a shape of the at least one projection in cross-section is one of part cylindrical, part triangular with rounded edges and part polygonal with rounded edges. Such shapes of the at least one projection can be produced easily and typically do not have any sharp edges that could damage the film forming the cartridge wall.

Preferably a height of the at least one projection is selected in the range of 0.4 mm to 2.5 mm, preferably 0.5 mm to 0.7 mm, in a radial direction. Such heights permit the film to be actively pushed into the at least one recess present at the core to collect any slack present in the film forming the cartridge wall. The width of the at least one projection in the circumferential direction may be selected in the range of 2 mm to 15 mm, preferably 4 mm to 9 mm.

Advantageously, a plurality of projections is provided at the inner surface of the collar. During manufacture of such cartridges, the film can be attached more readily to the core having a plurality of recesses, as the circumference of the core is reduced in comparison to a core that has no recesses. This means that the collar of the head part of a cartridge formed at such a core has a plurality of projections with the number thereof corresponding to the number of recesses.

If a plurality of projections are provided it is advantageous if the plurality of projections comprises first projections and second projections, with the first and second projections having different shapes, diameters, widths and/or dimensions.

Preferably the plurality of projections is non-uniformly distributed around the inner surface of the collar.

Advantageously, at least one pair of projections is provided with each member of each at least one pair of projections being oppositely disposed at the inner surface of the collar, wherein an odd number of pairs of projections is preferably provided.

It is preferred if the collar of the head part has at least two oppositely disposed sections that extend in a circumferential direction of the collar and that have an at least substantially uniform thickness.

It is preferred if the front end of the film is connected to the inner surface of the collar. Alternatively the front end of the film is embedded within the collar. Embedding the front end of the film in the collar in particular means that end face of the front end of the film can be protected from aggressive substances that may be present in the cartridge. This is particularly beneficial if multi-layered films are used, where certain layers satisfy certain functions and one of these layers may be susceptible to substances stored in the cartridge. The film may e.g. be embedded over a length of 0.5 to 2.5 mm, preferably 1 to 1.5 mm, in particular approximately 1.2 mm, in the longitudinal direction.

BRIEF DESCRIPTION OF THE DRAWINGS

The invention will be explained in more detail hereinafter with reference to the drawings.

FIG. 4 is a perspective view of a first core according to the invention;

FIG. 5 is a perspective view of a second core according to the invention;

DETAILED DESCRIPTION OF THE EMBODIMENTS

Figure 1:
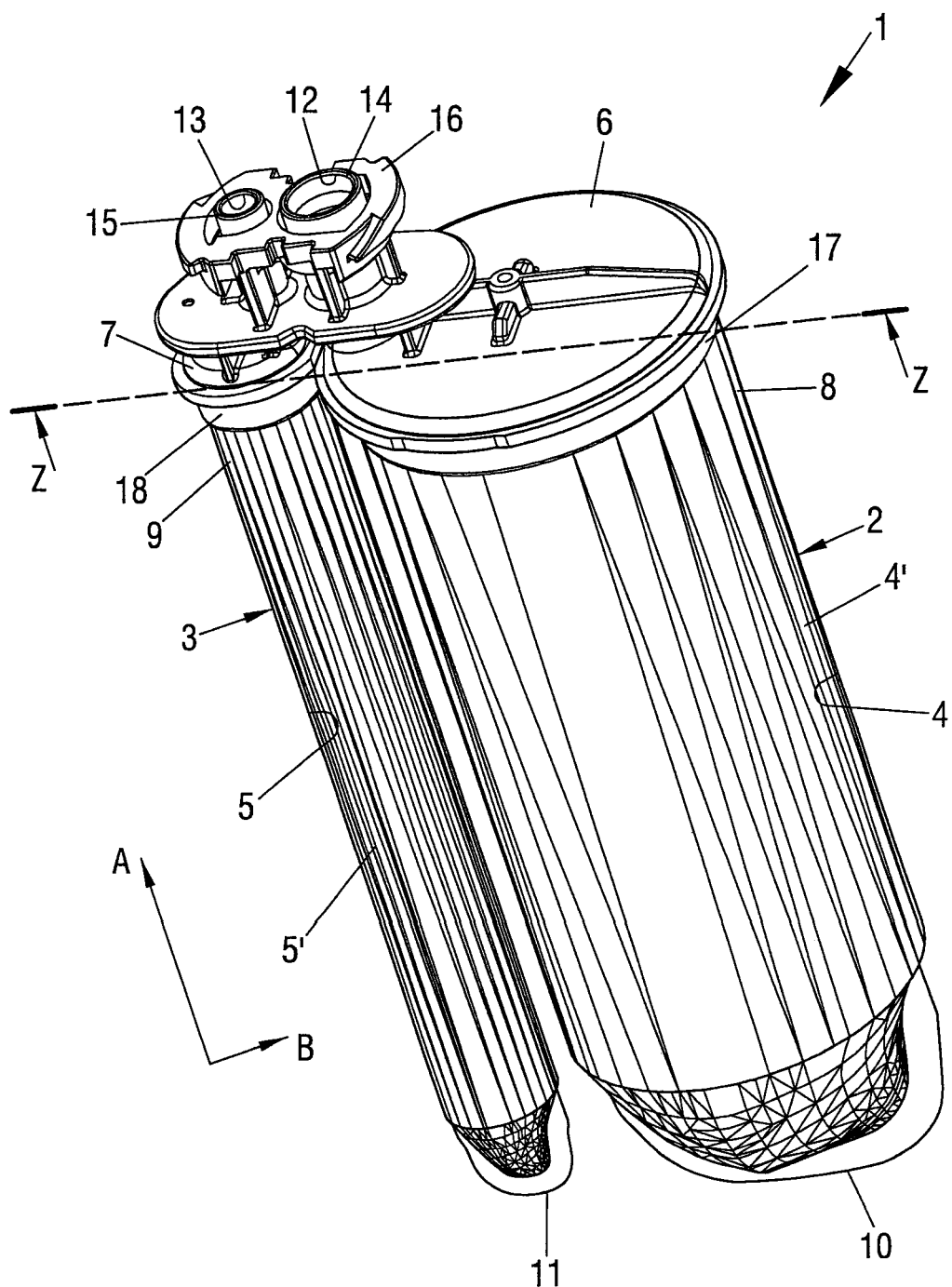
FIG. 1 is a perspective view of a cartridge.

In the following the same reference numerals will be used for parts having the same or equivalent function. Any statements made having regard to the direction of a component are made relative to the position shown in the drawing and can naturally vary in the actual position of application.

FIG. 1 shows a cartridge 1 configured as a two-component cartridge. The cartridge 1 comprises two generally cylindrical cartridge chambers 2, 3. The cartridge chambers 2, 3 are each bound by a cartridge wall 4, 5 as well as by a head part 6, 7, with each head part 6, 7 being arranged at a respective front end 8, 9 of the cartridge wall 4, 5. Each cartridge wall 4, 5 extends in a longitudinal direction A of the cartridge 1 from a respective rear end 10, 11 to the respective front end 8, 9.

Each head part 6, 7 is a stable shaped part of generally plate-like shape and comprises respective dispensing outlets 12, 13 via which a respective medium (not shown) can be dispensed from the cartridge chambers 2, 3. The two dispensing outlets 12, 13 extend from the head parts 6, 7 as outlet passages 14, 15 through a common outlet part 16. A mixing tip or closure part (each not shown) can be connected to the outlet part 16.

Figure 2:
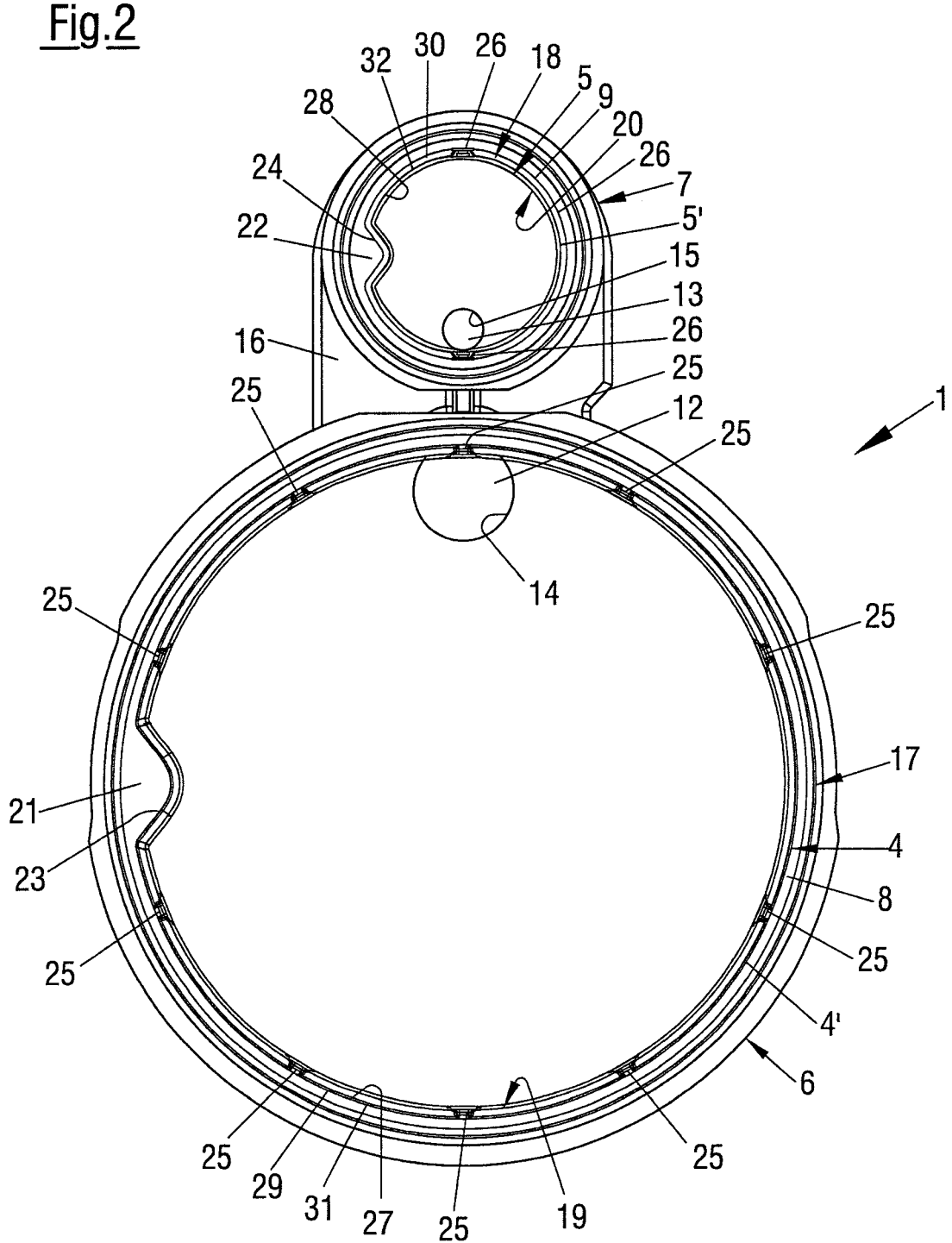
FIG. 2 is a cross-sectional view through the head parts of a cartridge according to a first embodiment of the invention.
Figure 3:
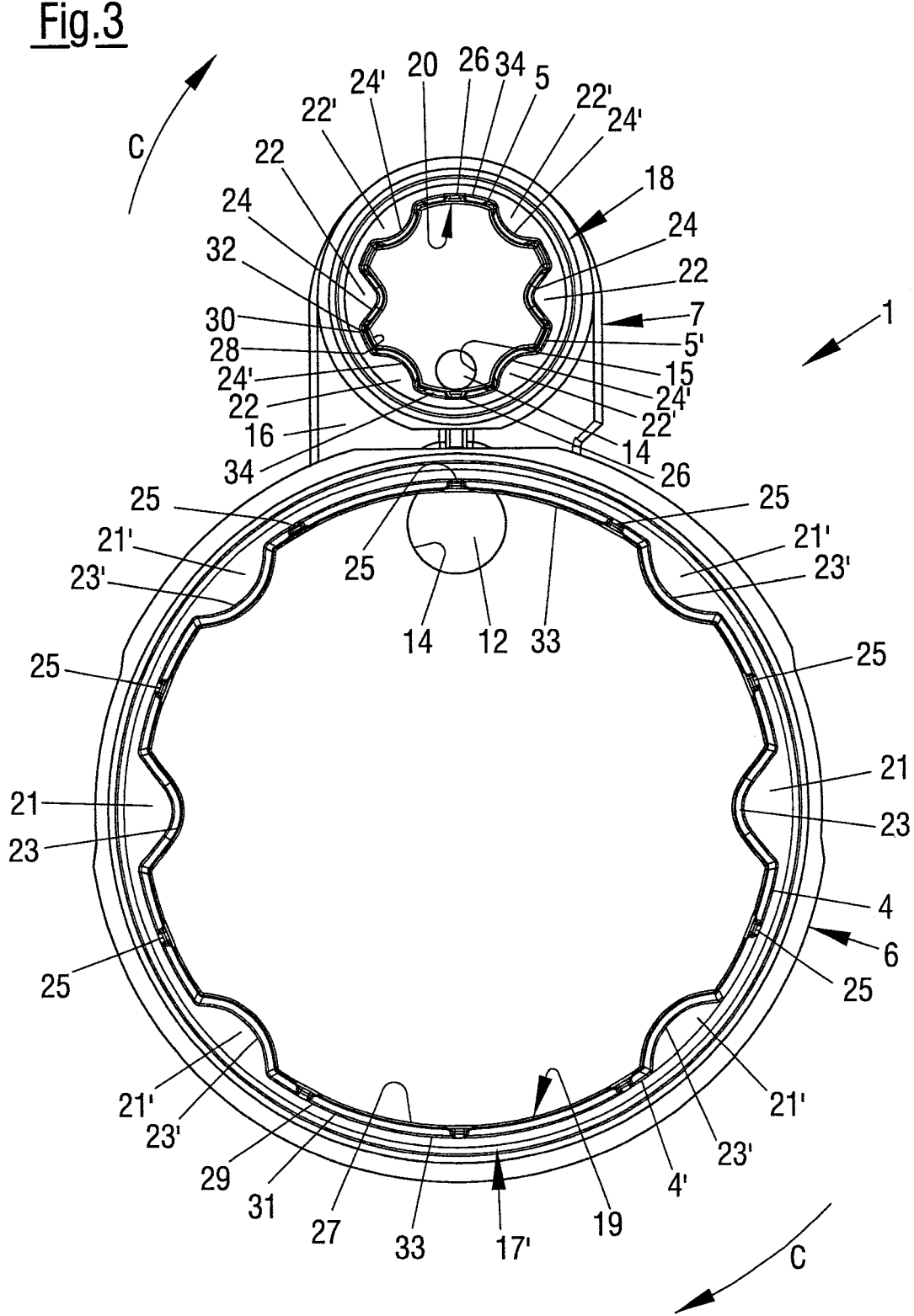
FIG. 3 is a cross-sectional view through the head parts a cartridge according to a second embodiment of the invention.

Each head part 6, 7 has a collar 17, 18, with each collar 17, 18 surrounding the dispensing outlet 12, 13 in a radially outer region of the head part 6, 7 (see FIGS. 2 and 3). A radial direction B is indicated relative to the arrow A used to identify the longitudinal direction A. Each collar 17, 18 has a length extending in the longitudinal direction A. The front end 8, 9 of each cartridge wall 4, 5 is sealingly and non-releasably connected to the collar 17, 18 of the head part 6, 7.

The cartridge walls 4, 5 are each formed from a film 4', 5'. Each rear end 10, 11 of the cartridge walls 4, 5, formed from the film 4', 5', is welded shut in a sealing manner in the present example to form a film bag.

It should be noted in this connection that the rear end 10, 11 could also be connected to a fixed shaped part (not shown). In this way the cartridge walls 4, 5 could be adapted to permit movement of a piston (also not shown) within the cartridge walls 4, 5.

It should further be noted in this connection that the film 4', 5' forming the cartridge walls 4, 5 can be a multilayer film having at least two layers formed from different materials. Such multi-layer films are used e.g. when particularly aggressive substances are stored in the cartridge 1.

It should also be noted that the film 4', 5', regardless of whether it is a film made from one type of material or a multilayered film made from one or more different types of materials, can have a thickness of at most 0.3 mm, more specifically of at most 0.15 mm, preferably of approximately 0.085 mm.

FIG. 2 shows a cross-sectional view through the head parts of the cartridge 1 according to a first embodiment along a line Z-Z (see FIG. 1). The collar 17, 18 of the respective head part 6, 7 has an inner surface 19, 20 extending in the longitudinal direction A. Each inner surface 19, 20 comprises one projection 21, 22 projecting radially inwardly.

The front end 8, 9 of the cartridge wall 4, 5 has a depression 23, 24, with the depression 23, 24 being aligned with the respective projection 21, 22 of the inner surface 19, 20 of the collar 17, 18.

Each projection 21, 22 extends at least substantially over the length of the inner surface 19, 20 of the collar 17, 18 in the longitudinal direction A. In the example shown in FIG. 2, the length of the inner surface 19, 20 of the collar 17, 18 and a length of the projection 21, 22 in the longitudinal direction A may e.g. be approximately 5 to 20 mm respectively.

A shape of the projection 21, 22 in cross-section is partly triangular with rounded edges and the height of the projection 21 may be selected as approximately 0.4 to 2.5 mm in the radial direction B and the height of the projection 22 may be selected as approximately 0.2 to 2 mm in the radial direction B.

The inner surfaces 19, 20 of the collars 17, 18 comprise respective cut-outs 25, 26 that are spaced apart from one another around the inner surface 19, 20.

The front ends 8, 9 of the cartridge walls 4, 5 that are formed by the film 4', 5' are arranged in the respective collar 17, 18. To this end the respective collar 17, 18 has an inner annular section 27, 28 and an outer annular section 29, 30 with a circumferential groove 31, 32 disposed between the inner annular section 27, 28 and the outer annular section 29, 30. The front end 8, 9 of the film 4', 5' is sealingly and non-releasably embedded in the circumferential groove 31, 32 disposed between the inner annular section 27, 28 and the outer annular section 29, 30. In this way in particular the respective end faces of the front ends 8, 9 of the cartridge walls 4, 5 are completely covered by the material of the head parts 6, 7.

It should be noted in this connection that a depth of each cut out 25, 26 in the longitudinal direction A is less than a depth of the circumferential groove 31, 32 disposed between the inner annular section 27, 28 and the outer annular section 29, 30.

It should further be noted in this connection that the collar 17, 18 could also only comprise one annular section (not shown) in which case the respective front end 8, 9 of the respective cartridge wall 4, 5 could be attached to e.g. the inner surface 19, 20 of the collar 17, 18 rather than to the collar 17, 18 within the circumferential groove 31, 32.

In any event the collar 17, 18 has a generally round, in particular circular, external shape in cross-section in the embodiments shown. It should be noted that the external shape is generally adapted to the shape of the cartridge 1 and that deviations from a round external shape can be selected if a specific design of a cartridge 1 is chosen.

FIG. 3 shows a cross-sectional view through the head parts of a slightly amended cartridge according to a second embodiment of the invention, similar to the cross-sectional view of FIG. 2. In this embodiment the inner surface 19, 20 of the collar 17, 18 of the respective head part 6, 7 comprises a plurality of projections 21, 21', 22, 22' projecting radially inwardly. In fact six projections 21, 21', 22, 22' are provided at each inner surface 19, 20.

These six projections 21, 21', 22, 22' comprise first projections 21, 22 and second projections 21', 22' with the first and second projections 21, 22, 21', 22' having different shapes and dimensions e.g. widths and heights.

The second projections 21', 22' are part cylindrical in shape and the height of the projection 21' may be selected as approximately 0.2-2.3 mm in the radial direction and the height of the projection 22' may be selected as approximately 0.2-2 mm in the radial direction. The length of the second projections 21', 22' may be selected as approximately 5-20 mm. The dimensions of the first projections 21, 22 correspond to those mentioned with regard to FIG. 2.

The plurality of projections 21, 22, 21', 22' is non-uniformly distributed around the inner surface 19, 20 of the collar 17, 18. In fact the first and second projections 21, 22, 21', 22' are provided as pairs of projections 21, 22, 21', 22', with each member of each pair of projections 21, 22, 21', 22' being oppositely disposed at the inner surface 19, 20 of the collar 17, 18. It should be noted that an odd number of pairs of projections 21, 22, 21', 22' is provided in the present instance, with a respective pair of second projections 21', 22' being arranged either side of the pair of first projections 21, 22.

The collar 17, 18 of each head part 6, 7 has two oppositely disposed sections 33, 34 that extend in a circumferential direction C of the collar 17, 18 and that have an at least substantially uniform thickness. The two oppositely disposed sections 33, 34 having a uniform thickness are arranged between two members of oppositely disposed pairs of second projections 21', 22'.

FIG. 4 shows a first embodiment of a core 35 for a mold for molding and thereby attaching a head part 6, 7 of a cartridge 1 to a film 4', 5' forming a cartridge wall 4, 5. The core 35 comprises a cartridge head forming end 36. A plurality of recesses 37 is formed in the cartridge head forming end 36 at an outer circumferential surface 38 of the core 35. The plurality of recesses 37 extends in a longitudinal direction A of the core 35. In a top view of the core 35 in the longitudinal direction A, a profile of the cross-section of the cartridge head forming end 36 has a corrugated shape, in particular a star shaped cross-section.

It should be noted in this connection that the longitudinal direction A of the core 35 coincides with the longitudinal direction A of the cartridge 1.

The plurality of recesses 37 extends from an end face 39 of the cartridge head forming end 36 in the longitudinal direction A. A shape of a cross-section of each of the plurality of recesses 37 is part cylindrical. Each recess 37 has an elongate shape having a length in the example of FIG. 4 of e.g. approximately 25 mm in the longitudinal direction A. A depth of each recess 37 from the outer circumferential surface 38 of the core 35 may be approximately 0.4-3 mm in the radial direction B of the core 35 which coincides with the radial direction B of the cartridge 1.

The core 35 further comprises a cavity 40 extending between the outer circumferential surface 38 of the core 35 and the end face 39. The cavity 40 circumferentially extends around the core 35 in the circumferential direction C and throughout the plurality of recesses 37. A length of the cavity 40 may be approximately 5-20 mm in the longitudinal direction A and a depth of the cavity may be approximately 0.5-1.5 mm in the radial direction B.

A plurality of protrusions 41 are arranged in the cavity 40. The plurality of protrusions 41 are specifically arranged at an outer boundary of each recess 37. The plurality of protrusions 41 projects towards the outer circumferential surface 38. The plurality of projections 41 is set back from the end face 39 and from the outer circumferential surface 38. Alternatively, the plurality of projections 41 may be flush with the outer circumferential surface 38.

FIG. 5 shows a second embodiment of a core 35 in which the cartridge head forming end 36 is designed in order to produce the head part 4 shown in FIG. 3. To this end the plurality of recesses comprises first recesses 37 and second recesses 37'.

The first and second recesses 37, 37' have different shapes and diameters, with the shape of the recesses 37, 37' corresponding to the shapes of the projections 21, 21' shown in FIG. 3. This means that the first recesses 37 shown in FIG. 5 have a partly triangular shape with rounded edges in cross-section and the second recesses 37' have a part cylindrical shape in cross-section.

In this way the profile of the cross-section of the cartridge head forming end 36 has a rounded shape having recesses 37, 37' formed therein, with the recesses 37, 37' having different shapes, namely arched and part circular shapes. A depth of the first recesses 37 may be selected as approximately 0.4-2.5 mm and a depth of the second recess 37' may be selected as approximately 0.2-2.3 mm in the radial direction B. The cartridge head forming end 36 also has two oppositely disposed sections 42 that are free of recesses.

The protrusions 41 of FIG. 5 extend to the outer circumferential surface 38 where they merge with the outer circumferential surface 38. Like with regard to FIG. 4 the protrusions 41 shown in FIG. 5 are set back from the end face 39.

Figure 6:
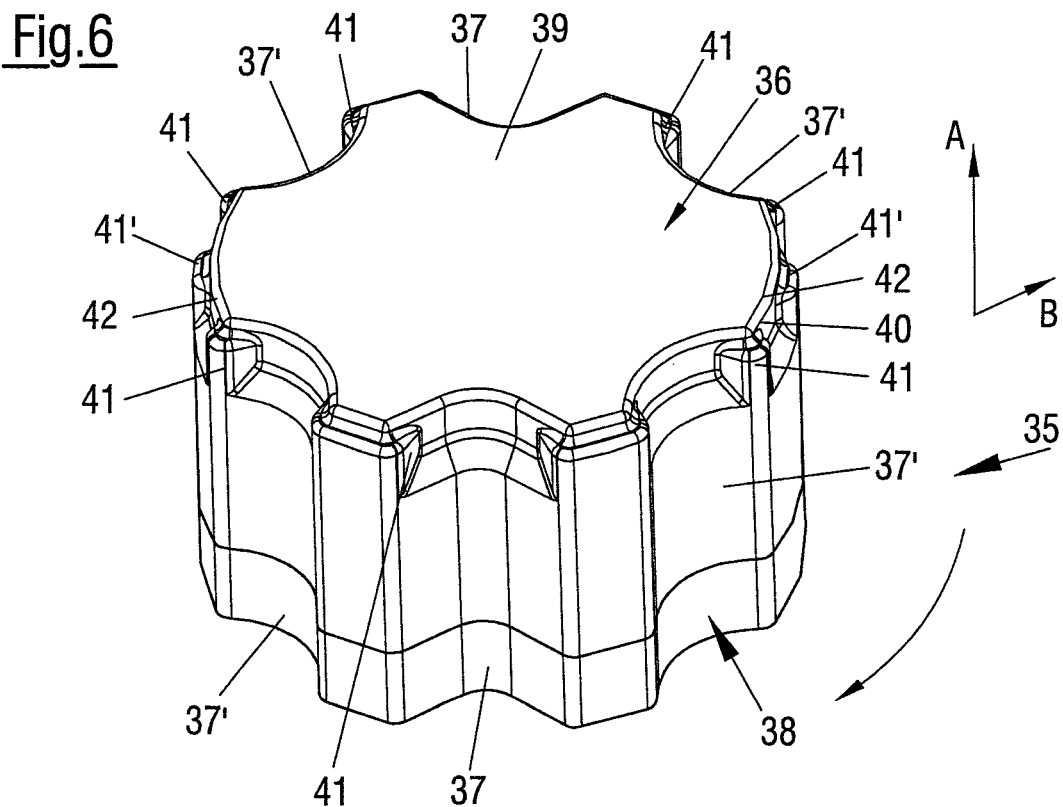
FIG. 6 is a perspective view of a third core according to the invention.

FIG. 6 shows a third embodiment of a core 35. The difference between the core 35 of FIG. 6 and that shown in FIG. 5 is that the core 35 of FIG. 6 comprises first and second types of protrusions 41, 41'. The first protrusions 41 are arranged at the boundaries between adjacent recesses 37, 37' and the second protrusions 41' are arranged in the cavity 40 in the two oppositely disposed sections 42 that are free of recesses. The first protrusions 41 also extend into the recesses 37, 37'.

Figure 7:
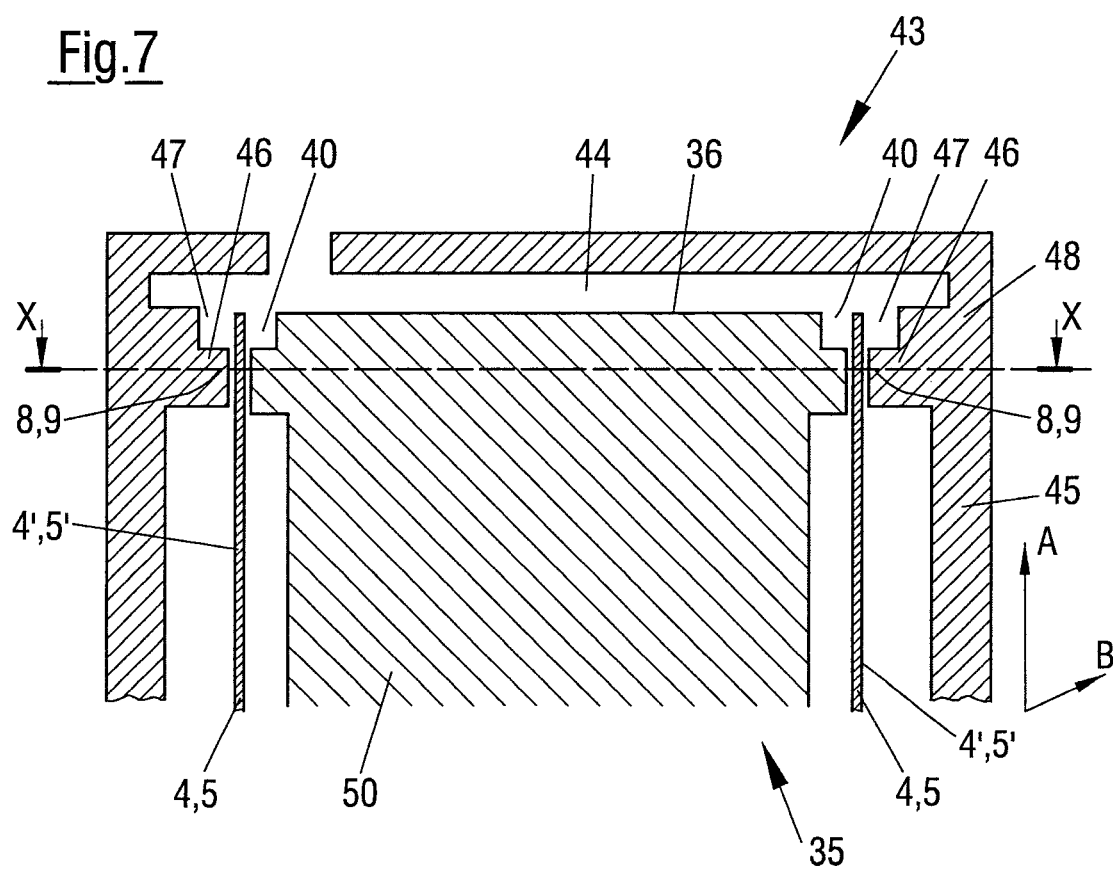
FIG. 7 is a part sectional view of a mold according to the invention.

FIG. 7 shows a section through a part of a mold 43 for molding the head part 6 of the cartridge 1 of FIG. 3. The mold 43 comprises the core 35 shown in FIG. 5 and a region forming a head space 44 in which the head part 6 of the cartridge 1 shown in FIG. 3 is formed. During a molding process the film 4', 5' forming the cartridge wall 4 is sealingly and non-releasably connected to the head part 6. The mold 43 is composed of two half shells of which only one half shell 45 can be seen in FIG. 7. Each half shell includes a portion acting like a circumferentially extending slider 46. The circumferentially extending slider 46 engages all of the film 4', 5' surrounding the core 35 that is present in the half shell 45 at a position of the slider 46. The slider 46 thereby also engages the core 35 that is present in that half shell 45 via the film 4', 5'.

In particular the slider 46 engages the core 35 directly adjacent to the cartridge head forming end 36 of the core 35. In use the two portions forming sliders form a lower boundary of the head space 44.

The core 35 further comprises a section 50 of reduced outer diameter. The section 50 of reduced outer diameter is arranged directly adjacent to the cartridge head forming end 36 of the core 35. The section 50 of reduced outer diameter extends from the cartridge head forming end 36 to the other end (not shown) of the core 35. In use this section 50 of reduced outer diameter permits the film 4', 5' to be more easily placed over this part of the core 35 prior to the molding of the head part 6, 7 of the cartridge 1.

Moreover, an annular recess 47 is present in the half shell 45. In use of the mold 43 the space formed between the annular recess 47, the slider 46 and the film 4', 5' forming the cartridge wall 4 forms the part of the mold 43 responsible for forming the outer annular section 29 of the collar 17.

Likewise the space formed in the cavity 40 of the head forming end 36 between the film 4', 5' forming the cartridge wall 4 and the core 35 forms that part of the mold 43 responsible for forming the inner annular section 27 of the collar 17. In order to produce the head part e.g. shown in FIG. 3, each slider 46 has three mold projections 49, 49' (see FIGS. 8A and 8B) that have a shape that respectively corresponds to the shape of the first and second projections present at the inner surface 19 of the collar 17. These mold projections 49 of the slider 46 engage the film 4', 5' at the position of the recesses 37, 37' of the core 35 of FIG. 5.

During manufacture of the head part 6, 7 of the cartridge 1, the film 4', 5' forming the cartridge wall 4 is placed on the core. The film 4', 5' and the core 35 are subsequently placed into the mold 43 and the two sliders 46 are moved towards one another to clamp the film 4', 5' into position by inserting the mold projections 49 of the slider 46 into the recesses 37, 37' of the core 35 and clamping the film 4', 5' forming the cartridge wall 4, 5 between them. Thereafter the head part 6, 7 is injection molded in the head space 44 of the mold 43 to form the head part 6, 7 and to sealingly and non-releasably connect the film 4', 5' to the head part 6, 7.

Figure 8A:
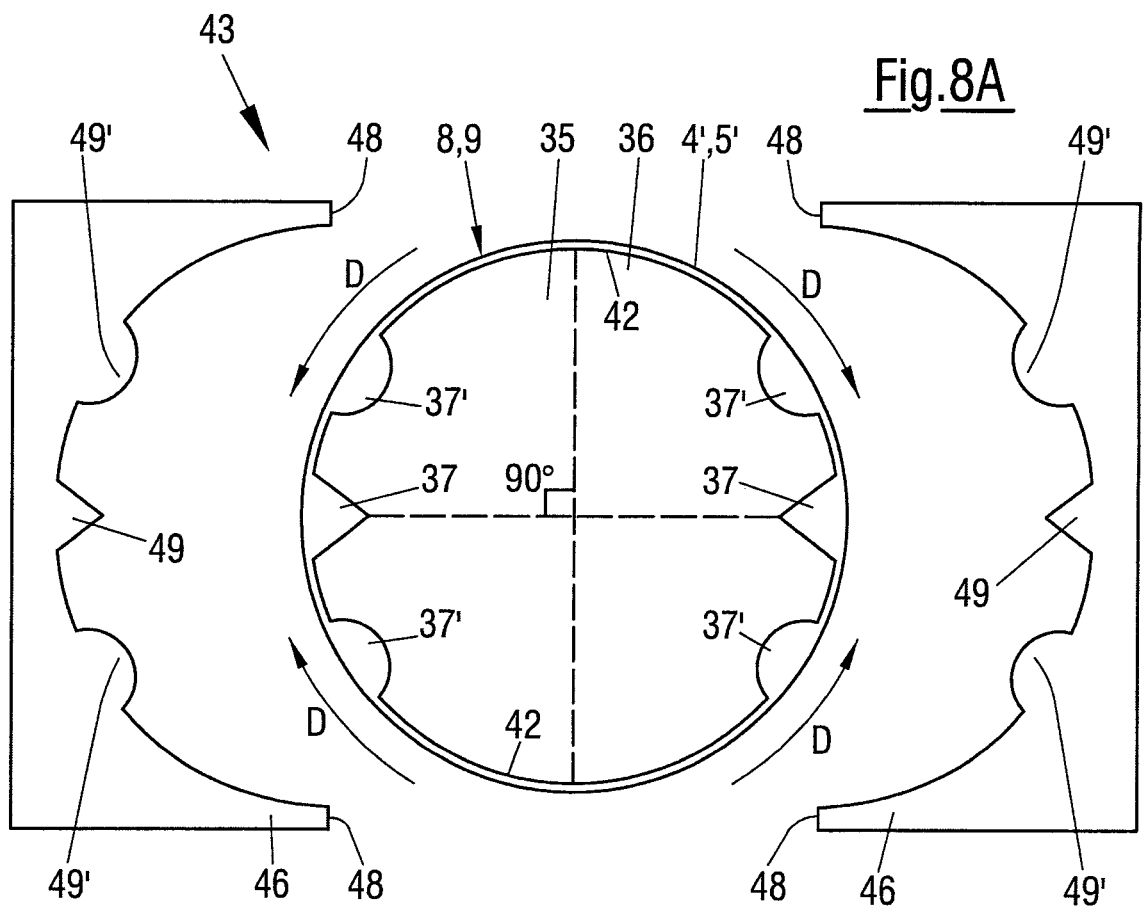
FIG. 8A is a sectional view of the mold according to FIG. 7 in an open position.
Figure 8B:
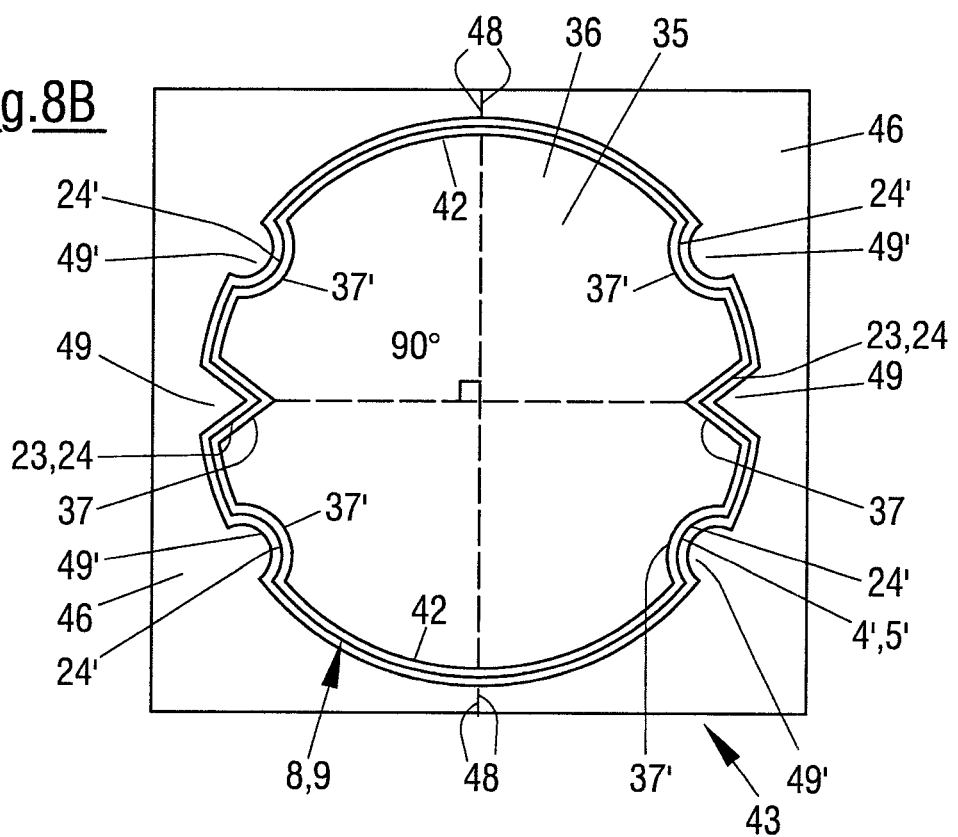
FIG. 8B is a sectional view of the mold according to FIG. 7 in a closed position.

FIGS. 8A and 8B show sectional views of the mold 43 along the line X-X of FIG. 7. The mold 43 is shown in two positions an open position and a closed position. FIG. 8A shows the mold 43 in the open position. In this position the front end 8, 9 of the film 4', 5' has been placed at the core 35 in the region of the cartridge head forming end 36. The mold 43 comprises first mold projections 49 and second mold projections 49'. The first and second mold projections 49, 49' are still remote from the film 4', 5' and thus from the recesses 37 of the core 35.

On moving the two sliders 46 towards one another into the closed position of FIG. 8B, the first mold projections 49 actively push the film 4', 5' into the recesses 37 to collect any slack that may be present in the film 4', 5', in particular to remove any film 4', 5' that may be present in the region of two contact surfaces 48 of the sliders 46 of the mold 43. This movement of the film 4', 5' in the direction of the recess 37 is indicated with the arrows D in FIG. 8A. Thereafter the second mold projections 49' additionally move any remaining slack that may be present into the second recesses 37' on a further closing of the mold 43. In this way a tight fit of the film 4', 5' to the core 35 is ensured on closing the mold 43. In order to ensure that any slack of the film 4', 5' forming the cartridge wall 4, 5 is collected and that the strain exerted on the film 4', 5' on moving the sliders 46 together is ideally selected the shape and size of the recesses 37, 37' have to be dimensioned appropriately.

The pushing of the film 4', 5' against the core 35 is achieved by the respective first and second mold projections 49, 49' of the sliders 46 that close in on the core 35 from opposite sides. Conventionally, this would have been half-circles. In accordance with the present teaching the sliders 46 comprise the first and second mold projections 49, 49' that have shapes matching the core 35 with its recesses 37, 37'. Such a contact needs to be well established over the full circumference, since the two sliders 46 also close off the head space 44.

It should also be noted that the depressions 23, 23', 24, 24' present in the front end 8, 9 of the film 4', 5' after molding are formed due to the respective first and second mold projections 49, 49' shifting some of the film 4', 5' into the respective first and second recesses 37, 37' (see FIG. 8B). The material of the film that forms the depressions 23, 23', 24, 24' is moved in particular away from the region of the contact surfaces 48 thereby ensuring that no material of the film 4', 5' can be trapped between the two contact surfaces 48 of the mold 43.

Due to the direction of movement of the sliders 46, not all shapes of recesses 37, 37' are possible at all positions. Certainly one would be able to use all sorts of shapes with increasing number of parts and more complex movements, as is the case with the core 35 shown in FIG. 4. But in order to keep the manufacturing costs low, a two-slider-configuration is ideal. For this reason no recess 37, 37' is provided at the contact points of the half shells 45 (sliders 46), but rather sections 42 without recesses 37, 37' are disposed on this part of the core 35.

As the point of contact of the two half shells 45 is prone to the risk of jamming some of the film 4', 5' forming the cartridge wall 4 between the sliders 46, the first recesses 37 are provided with a larger depth than the second recesses 37' (if provided). In this way the first recesses 37 are engaged first by the corresponding mold projections 49 of the sliders 46 (not shown) such that the film 4', 5' is tensioned and pulled away from the point of contact of the two half shells 45.

This means that a deeper recess 37 is disposed at a 90 degree position (see FIGS. 8A and 8B) with respect to the contact surface 48 between two sliders 46 in a two slider configuration, such that the projection of the slider 46 at the 90 degree position is more pronounced compared to the other projections and that the projection at the 90 degree position makes contact with the film 4', 5' first there and pulls it away from the contact surface of the two half shells 45.

A potential improvement (with increased complexity) would be to make this part of the slider elastic (e.g. to realize the projection as an additional part which is mounted with a spring. So the mold projection 49 at the 90 degree position engages the first recess 37 first and once the other mold projections (not shown) engage the second recesses 37', the elastic projection at the 90 degree position is pushed against the spring force of the spring (not shown) into a firm connection with the slider 46.

There is a degree of freedom regarding the number of recesses 37, 37' disposed on the core 35 and their depth. In the simplest case one rather deep recess 37 is provided (see the corresponding head part in FIG. 2). In other embodiments, such as the ones shown in FIGS. 4 to 6, a plurality of recesses 37, 37' is provided that are shallower compared to the embodiment in which only one recess 37 is provided.

On providing a plurality of recesses 37, 37', one has to be aware that fine structures have to be avoided due to manufacturing issues at the mold 43 (avoidance of too small radii) and risks of tearing the film 4', 5' at sharp corners.

On the other hand, the provision of too few recesses 37, 37' means that these need to be deeper. Deeper recesses 37, 37', however, lead to projections 21, 22 having a height which is too large and these can be in conflict with a circular piston (not shown) pushing the film 4', 5' forming the cartridge wall 4, 5 towards the head part 6, 7.

A larger height of the projections 21, 22 means that these project further in the radial direction B away from the inner surface 19, 20 of the collar 17, 18 of the cartridge 1, hence blocking the movement of the piston on the last millimeters before reaching the head part 6, 7.

It has been discovered that the number of recesses 37, 37' can range between 2 and 10 (i.e. 1 to 5 per half circle). Selecting an odd number of recesses 37, 37' per half circle around the core 35 enables the use of one deeper projection on each slider 46 at the 90 degree angle to the contact point of the sliders 46 enabling the previously discussed effect of pulling the film 4', 5' away from said contact surface 48.

The embodiments of the core 35 shown in the foregoing are respectively provided with a plurality of protrusions 41, 41'. These protrusions 41, 41' act as spacer elements in the mold 43 and enable the front end 8, 9 of the film 4', 5' forming the cartridge wall 4, 5 to be aligned at least substantially in parallel along the longitudinal direction A. As shown in FIG. 7, the inner annular section 27, 28 can be formed between the film 4', 5' and the core 35 due to these protrusions 41, 41' which maintain a position of the front end 8, 9 of the film 4', 5'. In this way the front end 8, 9 of the film 4', 5' is embedded in a sealing and non-releasable manner within the collar 17, 18 of the head part 6, 7.

It should be noted in this connection that if no cavity 40 is provided, then the film 4', 5' is directly bonded to the inner surface 19, 20 of the collar 17, 18.

Alternatively, if the cavity 40 is provided, then the film 4', 5' is embedded within the collar 17, 18. In this case a shape of the cut-outs 25, 26 present in the collar 17, 18 of the respective head part 6, 7 corresponds to a shape of the respective protrusion 41, 41' present at the core. These protrusions 41, 41' are required in order to form a space present at either side of the film 4', 5' forming the cartridge wall 4, 5 during the injection molding process such that the resin used to form the respective head part 6, 7 can flow around both sides of the film 4', 5' so that an end face of the film 4', 5' is covered by the resin and hence subsequently protected by the head part. This is particularly beneficial when multi-layered films are used as the cartridge wall 4, 5, This is because some of the different materials used in a multi-layered film 4', 5' may be susceptible to the materials to be stored in the cartridge chamber 2, 3. Embedding the front end 8, 9 of the cartridge wall 4, 5 in the head part 6, 7 means that the material stored in the chamber 2, 3 cannot come into contact with e.g. a middle layer of a multi-layered film forming the cartridge wall 4, 5.

The invention claimed is:

1. A cartridge for a medium to be dispensed, comprising:
a head part having a dispensing outlet and a film forming a cartridge wall,
the film bounding a cartridge chamber for the medium to be dispensed, extending at least partially in a longitudinal direction of the cartridge and having a front end connected to the head part, the film being a multilayer film having at least two layers formed from different materials,
the head part having a collar, the collar surrounding the dispensing outlet in a radially outer region of the head part and extending in the longitudinal direction, the front end of the film sealingly and non-releasably connected to the collar of the head part,
the collar of the head part having an inner surface extending in the longitudinal direction and comprising at least one projection projecting radially inwardly, and
the front end of the film having at least one depression, with the at least one depression being aligned with the at least one projection of the inner surface of the collar.

2. The cartridge in accordance with claim 1, wherein the at least one projection extends at least substantially over a length of the inner surface of the collar in the longitudinal direction; or a length of the collar or a length of the at least one projection in the longitudinal direction is in the range of 2 mm to 20 mm.

3. The cartridge in accordance with claim 1, wherein a shape of the at least one projection in cross-section is one of partly cylindrical, partly triangular with rounded edges and partly polygonal with rounded edges; or a height of the at least one projection is in the range of 0.4 mm to 2.5 mm in a radial direction (B).

4. The cartridge in accordance with claim 1, wherein the collar of the head part has at least two oppositely disposed sections that extend in a circumferential direction of the collar and that have an at least substantially uniform thickness.

5. The cartridge in accordance with claim 1, wherein the front end of the film is connected to the inner surface of the collar or the front end of the film is embedded within the collar.

6. The cartridge in accordance with claim 1, wherein the at least one projection includes a plurality of projections disposed on the inner surface of the collar.

7. The cartridge in accordance with claim 6, wherein the plurality of projections comprise first projections and second projections with the first and second projections having different shapes, diameters, widths or dimensions.

8. The cartridge in accordance with claim 6, wherein the plurality of projections is non-uniformly distributed around the inner surface of the collar.

9. The cartridge in accordance with claim 1, wherein the at least one projection includes at least one pair of projections with each member of each at least one pair of projections being oppositely disposed on the inner surface of the collar.

10. The cartridge in accordance with claim 9, wherein the at least one pair of projections includes an odd number of pairs of projections.

11. A core for a mold for molding and thereby attaching a head part of a cartridge to a film forming a cartridge wall, with the film having a front end, the front end of the film to be sealingly and non-releasably connected to the head part, the core comprising:
a cartridge head forming end, at least one recess formed in the cartridge head forming end at an outer circumferential surface of the core, the at least one recess extending in a longitudinal direction of the core, the at least one recess forming a projection in a collar of the head part to be aligned with at least one depression at the front end of the film.

12. The core in accordance with claim 11, wherein a shape of a cross-section of the at least one recess is one of partly cylindrical, partly triangular with rounded edges and partly polygonal with rounded edges.

13. The core in accordance with claim 11, wherein the at least one recess has an elongate shape having a length in the range of 5 mm to 25 mm; or the at least one recess extends from an end face of the cartridge head forming end; or the at least one recess has a depth from the outer circumferential surface of the core in the range of 0.4 mm to 2.5 mm.

14. The core in accordance with claim 11, wherein at least one recess includes a plurality of recesses formed in the outer circumferential surface of the core, the plurality of recesses comprising first recesses and second recesses, the first and second recesses having different shapes, diameters, widths or dimensions; or the cartridge head forming end further comprises a cavity extending between the outer circumferential surface of the core and an end face of the core, the cavity circumferentially extending around the core and throughout the at least one recess.

15. The core in accordance with claim 11, wherein a profile of the cross-section of the cartridge head forming end has a rounded shape, a corrugated shape, a polygonal shape, or a rounded shape having recesses formed therein, at least part of the recesses having different shapes, different widths or different diameters in cross-section.

16. The core in accordance with claim 11, wherein the at least one recess extends in a uniform manner at least over an extent of the cartridge head forming end in the longitudinal direction of the core.

17. A mold for molding and thereby attaching a head part of a cartridge to a film forming a cartridge wall, the mold comprising:
a core in accordance with claim 11, a region forming a head space in which the head part of the cartridge is formed and within which the film is sealingly and non-releasably connected to the head part and at least two sliders configured to engage the film surrounding the core and to engage the core via the film adjacent to the cartridge head forming end, the at least two sliders forming a boundary of the head space.

18. The mold in accordance with claim 17, wherein
at least one of the at least two sliders has at least one mold projection corresponding to a shape of the at least one recess of the core.

19. A method of manufacturing a cartridge using a mold in accordance with claim 18, the method comprising:
placing the at least one film on the core;
placing the film and core in the mold;
moving the at least two sliders to clamp the film into position by inserting the at least one mold projection into the at least one recess and clamping the film between them; and
injection molding a head part of the cartridge in the head space of the mold to form the head part and to sealingly and non-releasably connect the film to the head part.

* * * * *